June 19, 1934.  H. J. WOODALL ET AL  1,963,392
AUTOMOBILE CLOSED BODY CONSTRUCTION
Original Filed Aug. 2, 1926
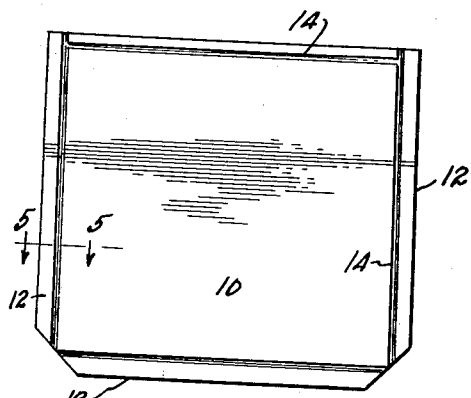
Fig. 1
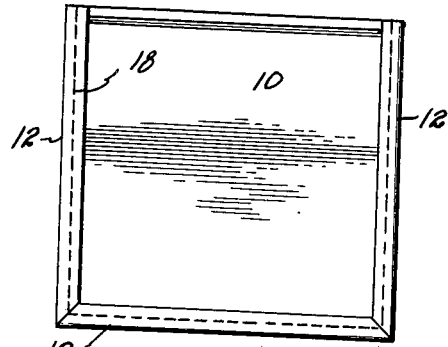
Fig. 2
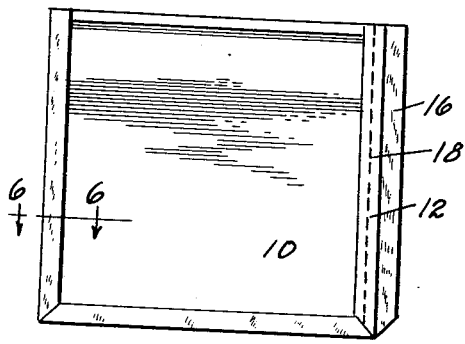
Fig. 3
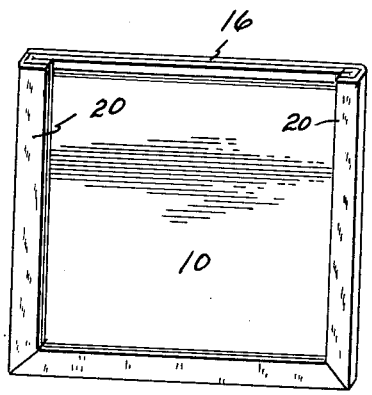
Fig. 4
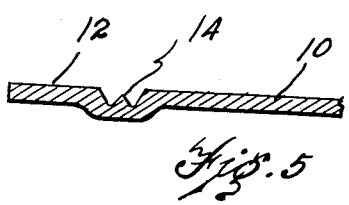
Fig. 5
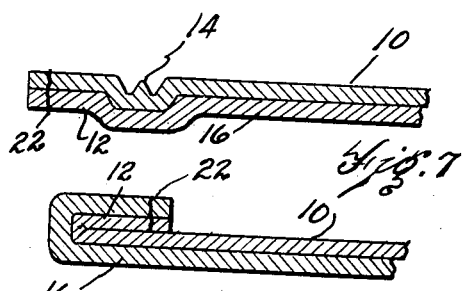
Fig. 7
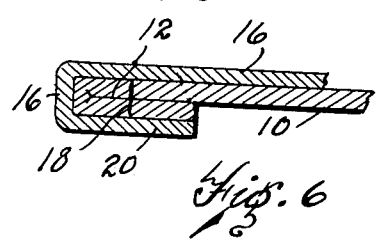
Fig. 6
Fig. 8
INVENTORS
HERBERT J. WOODALL
BY  MEREDITH G. RANDALL
Parker & Burton
ATTORNEY.

Patented June 19, 1934

1,963,392

UNITED STATES PATENT OFFICE 1,963,392

AUTOMOBILE CLOSED BODY CONSTRUCTION

Herbert J. Woodall and Meredith S. Randall, Detroit, Mich., assignors to Woodall Industries Incorporated, Detroit, Mich., a corporation of Michigan Application August 2, 1926, Serial No. 126,586
Renewed March 31, 1931

5 Claims. (Cl. 45—138)

Our invention relates to an improved cardboard or composition fiber board panel structure and to an improved method of manufacturing the same.

We have illustrated our invention as embodied in a covered cardboard panel of a character suitable for use in closed automobile body construction.

An object of our invention is to provide a simple, inexpensive, self-supporting, substantially rigid and durable cardboard panel adapted to be easily and quickly fastened to a supporting frame and which, when applied thereto, possesses a sightly appearance, and which is so constructed and assembled that, when in position upon the frame, the securing means, through the employment of which it is fastened to the frame, is concealed and protected and the edges of the covering material carried by the panel are likewise concealed and protected.

Our improved panel has a marginal portion which is disposed adjacent the frame and it is so formed that capillary movement of moisture beyond the concealed marginal portion is effectively obstructed and the interior exposed portion of the panel is thereby prevented from becoming warped or otherwise deformed. We provide a crease positioned in proximity to the margin of the panel, preferably spaced therefrom and preferably continuous in character, which crease obstructs the capillary passage of moisture from such margin beyond said crease into that portion of the panel bounded by the crease.

A cardboard wall panel of this general type has a relatively porous interior structure and an outer surface which, due to the particular formation of the panel or treatment thereof, is substantially impervious to ordinary moisture conditions, but the panel has cut edges which expose the relatively porous interior structure of the panel to the attack of moisture, and in an ordinary flat panel of this character moisture seeps from these unsealed edges into the porous interior structure, and if the panel is fastened down at or adjacent the edges, which is generally the case when the same is used, this moisture seepage produces buckling and warping of the panel structure and in many cases this occurs to such an extent that the usefulness of the panel is destroyed.

Due to the barrier established by our line of compression formed by the crease, we compact the interior porous structure of the panel along a line adjacent and parallel to a cut edge to such an extent as to dam up and prevent to a large degree the passage of moisture from that marginal portion of the panel which is outside of the crease line to the interior expanse of the panel which is inside of the crease line. It will also be observed that when the panel is covered and the covering material stitched down, it is stitched beyond the crease line so that any tendency of moisture to seep in through the apertures formed in the stitching is likewise obstructed at the crease line from passing into the interior of the panel itself.

Other important advantages and meritorious features of our improved construction and the method of its manufacture will more fully appear from the following description of the illustrative embodiment here shown, and from the appended claims. In the drawing:

Fig. 1 represents a panel blank partly formed.

Fig. 2 illustrates the completed panel minus the covering material.

Fig. 3 illustrates the panel with covering material partly applied thereto.

Fig. 4 is a perspective view of the panel with covering material affixed thereon.

Fig. 5 is a cross-sectional view taken on line 5—5 of Fig. 1.

Fig. 6 is a cross-sectional view taken on line 6—6 of Fig. 3.

Fig. 7 is a cross-sectional view similar to Fig. 5 showing a modified form of securing the covering material in place.

Fig. 8 is a cross-sectional view taken on the same line as Fig. 6 showing the covering material affixed in the manner illustrated in Fig. 7.

Cardboard and other composition fiber board panels are widely used in the automobile industry and elsewhere as wall panel sections. These panels if used on an automobile body are suitably covered and fastened to the frame. In using fiber board panels in this connection it is highly desirable that the panel be so formed and assembled as to possess the following characteristics: It should be capable of being quickly and easily fastened in place; it should possess a sightly appearance when fastened in place; it should be of a sturdy, substantial construction so as to satisfactorily serve the purpose for which it is intended to be used; it should be so fastened in position that the fastening devices, through which it is secured to the frame, are concealed and protected and the edges of the covering material with which it is provided are likewise concealed and protected; and it should be so formed that capillary passage of moisture from its margin will be prevented so that the exposed interior expanse of the panel will not warp or become otherwise deformed. Our improved panel structure is inexpensive and answers the above exacting requirements.

We take a cardboard or other composition fiber board blank cut oversize the space to be occupied by the completed panel and crease the same as indicated in Fig. 5. In such figure of the drawing the main portion of the panel is indicated as 10 and the marginal portion beyond the crease as 12 and the crease itself as 14. We have illustrated our invention in connection with a door panel of conventional construction in which three edges only of the panel are folded over as illustrated in Fig. 2. The top edge of the panel is here left unfolded but the crease 14 may extend as shown in Fig. 1 across such top portion in proximity the edge thereof so that a continuous crease is formed adjacent the margin of the panel and for a purpose hereinafter described.

Interior panels of closed automobile bodies, such as the one here illustrated, are generally covered with suitable upholstery material and this covering material is indicated in the figures of the drawing as 16. It extends over one side of the panel and is secured thereto in a suitable manner.

In Fig. 1 we have shown in elevation a door panel having a main central portion 10 and three marginal portions 12 adapted to be folded along the crease line 14 to assume the form shown in Fig. 2. In Fig. 2 we have shown these marginal portions 12 as secured in the folded over relationship by stitching 18. This forms a peculiarly rigid panel structure.

Covering material 16 is then applied to the panel. This covering material is turned over the three folded edges of the panel and it may be suitably fastened in place by having its turned over edge portions 20 glued to the turned over marginal portions 12 of the panel. A cross-sectional view of this construction is shown in Fig. 6.

In Figs. 7 and 8 we have shown a modified form of construction. In these figures of the drawing the covering material is stitched or otherwise fastened (stitching being here shown) to the marginal portions 12 of the panel before they are folded. This is shown particularly in Fig. 7. This stitching is indicated as 22. The marginal portion of the panel is then folded over and it assumes the position shown in Fig. 8.

The panel structure is such that the folded over marginal portions are self-supporting and substantially rigid and retain their folded over relationship. The crease line 14 along which the marginal portions of the panel are bent will, it is apparent, indicate the size of the completed panel. Our improved panel is capable of being assembled on a supporting frame rapidly and easily.

The crease line 14, spaced from the margin of the panel, serves to obstruct the passage of moisture from the exposed edge of the panel beyond such crease. It therefore prevents the warping or otherwise deforming of that portion of the panel bounded by the crease line.

What we claim:

1. An interior wall panel for an automobile body comprising a cardboard panel creased along a line spaced from the margin thereof and provided with covering material extending over one side of said panel and secured thereto between the edge thereof and said crease line, said marginal portion of the panel to which the covering material is secured being folded back along the crease line forming a flange possessing sufficient rigidity to support the panel.

2. In an automobile body, an interior wall structure comprising a cardboard panel creased along a line spaced from its margin, covering material extending over one side of the panel and fastened thereto, said panel having a marginal portion folded inwardly along the line of the crease concealing and protecting the edge of the panel and the covering.

3. That method of forming a covered wall panel which comprises cutting a panel blank, creasing the same along a line spaced from the margin thereof, spreading covering material over one side of said blank and securing the same thereto along a line disposed between the crease and the margin of the panel and folding over that marginal portion of the panel to which the covering material is secured along the line of the crease and upon the uncovered side of the panel.

4. That method of forming a wall panel which comprises cutting a cardboard blank, creasing the same along a line spaced from the margin thereof, fastening covering material over one side of the panel and through the margin thereof beyond the crease line and folding the marginal portion of said panel to which the covering material is secured over upon the uncovered side of the panel along three edges thereof.

5. An interior trim panel for automotive bodies comprising a flexible sheet substantially impervious to moisture penetration through its face but susceptible to such penetration through the edges thereof, said panel including a portion bodily displaced from within the plane of the panel and compacted with relation to the remainder of the panel to produce a line of densification along said displacement, said portion extending substantially continuously adjacent the margin of the panel and separating the same from the broad interior expanse of said panel, and covering material positioned over the face of said panel and stitched thereto around the margin, said stitching being positioned between the outer edge of the panel and the densified portion thereof.

HERBERT J. WOODALL.
MEREDITH S. RANDALL.